United States Patent [19]

Groff

[11] Patent Number: 4,493,655

[45] Date of Patent: Jan. 15, 1985

[54] RADIO-CONTROLLED TEACHING DEVICE

[76] Inventor: James W. Groff, P.O. Box 38, Morgan Hill, Calif. 95037

[21] Appl. No.: 520,705

[22] Filed: Aug. 5, 1983

[51] Int. Cl.³ ............................................. G09B 7/00
[52] U.S. Cl. .................................. 434/351; 434/335; 434/346; 273/1 GE
[58] Field of Search ............... 434/169, 261, 258, 260, 434/319, 321, 327, 335, 336, 346, 350, 351, 362; 273/1 GC, 1 GE, 1 E

[56] References Cited

U.S. PATENT DOCUMENTS

| | | | |
|---|---|---|---|
| 3,416,243 | 12/1968 | Greenberg et al. | 434/351 |
| 3,623,242 | 11/1971 | Hoover | 434/319 |
| 3,676,939 | 7/1972 | Oberst et al. | 434/351 |
| 4,051,605 | 10/1977 | Toal et al. | 434/201 |
| 4,079,365 | 3/1978 | Yamauchi | 434/350 |
| 4,172,329 | 10/1979 | Chen | 434/319 |

Primary Examiner—Richard C. Pinkham
Assistant Examiner—Vincent Mosconi

[57] ABSTRACT

A radio-controlled teaching device comprising a teacher transmitter unit and a plurality of student receiver units for maintaining student alertness during oral reading of written textual material, for the oral administration of multiple-choice or true or false test material, and for the preparation and presentation of recorded programmed instructional material. The teacher transmitter unit contains a tone generator and radio transmitter which transmits discrete tone signals, either under manual control of the teacher or automatically under the control of a plural channel instructional tape recording. Each student receiver unit contains timers, a logic circuit, and a radio receiver which receives the above tone signals (which are transparent to the students) and provides a short time period during which the student is expected to respond by briefly closing a response switch. The short time periods correspond to portions of a text being orally read, such as the end of a paragraph, proper nouns, verbs, etc., which the teacher wishes to emphasize, or to the correct answer of a multiple-choice or true or false question which is also being orally read, or to a designated point within a recorded programmed lesson which is being played back by a tape player. If the student responds during the above time period, he receives a "right" score which is displayed on a digital readout. If the student responds at any time other than the above time period, he receives a "wrong" score which is also displayed. Whether or not the teacher wishes to record the scores, the students are aware they are individually challenged by the teaching device.

12 Claims, 6 Drawing Figures

RADIO-CONTROLLED TEACHING DEVICE

BACKGROUND AND SUMMARY OF THE INVENTION

This invention relates to the field of teaching aids, and is more particularly directed to a portable, self-powered teaching device which is radio-controlled and which stimulates student attentiveness during oral reading of textual material, as well as presenting extemporaneous testing and programmed instruction.

For many years a significant classroom problem has revolved around maintaining student alertness during oral reading where the student-teacher ratio may be on the order of 30 to 1 or higher. While one student is involved in oral reading, there are twenty-nine or more onlookers who should be silently following along in their textbooks, but may or may not be intent on the material being read. As any teacher can attest, more than a few students will be engaged in sleeping, daydreaming, passing notes, doodling, chatting with a neighbor, throwing spitballs, or much worse. The usual gambit used by the teacher in this situation is to dismiss the student who is reading and immediately call upon one of the miscreants to take his place. If class attention is still not up to par at this stage, the teacher subsequently calls on others in need of mentally joining the academic group. Sometimes the above stratagem is successful in snapping all members of the class to attention; other times the effort simply detracts from the lesson at hand. In the latter case, the teacher may decide to halt all oral reading and test the class to determine just how much of the lesson was learned, either directly or by osmosis. Unfortunately, however, few teachers look forward to correcting thirty or more test papers, and often eschew the "exchanging of papers" for student correction because of the mistakes, favoritism, and downright bickering it can create.

To mitigate these problems, a teaching device is provided which furnishes each student with a "receiver" at his desk, so that he or she can silently respond throughout an oral reading lesson or to a group test administered by the teacher. Since the teaching device requires no modification of reading materials and no teacher correction of test papers, the device can be freely used to stimulate student attentiveness during various portions of the classroom day. If desired, the teaching device can also present programmed instruction to an individual student, a small group of students, or to the entire class.

Accordingly, a general object of the present invention is to provide a portable, self-powered, radio-controlled teaching device for each student of a classroom, so that the teacher maintains a high level of student alertness by remaining in radio contact with each and every student during selected periods of the classroom day. A primary object of the present invention is to provide a teaching device which electronically transmits teacher-selected data to each student of a classroom, and which, in turn, requires individual student responses to the data without the necessity of wired connections between the teacher and students. Another object of the present invention is to provide a teaching device which is used to instantly and extemporaneously test the class on a selected subject area without the necessity for teacher-prepared examination papers and teacher or student correction of these papers. A further object of the present invention is to provide a teaching device which presents programmed instruction to an individual student, a group of students, or the entire class. Additional advantages of the present invention will be apparent from the following description of a preferred embodiment of the invention.

A preferred embodiment of the present invention provides a portable, self-powered, radio-controlled teaching device comprising a teacher transmitter unit and a plurality of student receiver units, one for each member of a classroom to use at his or her desk. The teaching device is operated when textual material is being read aloud by the teacher or a student while other class members follow along silently in their copies of the text. Each time the teacher depresses a switch provided on the front of the transmitter housing, a tone of preselected frequency is silently transmitted to all of the student receivers. The transmitter unit also contains a digital readout displaying the total number of times the above tone switch has been depressed by the teacher.

Each student receiver unit contains a tone decoder, a dual digital readout displaying the total "right" and "wrong" responses, and a response switch which is depressed immediately following certain designated portions of the text being read aloud. For example, if the teacher wanted to stress transitive verbs during a lesson, he would instruct the students to immediately depress their response switches each time a transitive verb was read in the textual material. The teacher, of course, depresses the tone switch on his teacher transmitter exactly when a transitive verb is being read, so that a tone is transmitted and detected at that exact point by all student receivers. Logic circuitry within the student units causes a "right" display to increase one count, if a student response switch has been depressed at the proper time; if the response switch is not depressed at the correct time, logic circuitry causes a "wrong" display to advance one count. Thus, the dual digital display in each receiver unit allows the teacher to score each student at the end of the lesson. The teacher may or may not elect to take scores; the students won't know until the lesson has been completed. Since each student must carefully follow along in his text as the oral reading progresses, his level of attentiveness must remain high in order to earn a high "right" score. A perfect score will be equal to the number displayed on the teacher transmitter unit at the end of a lesson. Most teachers will subtract the number "wrong" from the number "right" to discourage student guessing.

A particular application of the radio-controlled teaching device depends to a great extent upon the ingenuity and imagination of the teacher using it. In a phonics lesson, for example, the teacher may require that the student response switch be depressed when the student hears the sound "ē." In a music lesson (using an orchestral recording this time), the student responds when he first hears, for example, the "woodwind section". In a foreign language lesson, the student responds when, for example, the French word being read means "without." In a science lesson, the student responds when, for example, the compound mentioned in the text is a "hydroxide." In a history lesson, the student responds when, for example, the state mentioned was a member of the "Southern Confederacy," etc. If the teacher does not want to stress any particular point within a given portion of text, but simply wants to maintain attentiveness, he can instruct his students to depress their response switches at the end of each line, sentence, or paragraph.

The radio-controlled teaching device is also used to administer "true or false" and "multiple-choice" tests. Following the reading of a short story, the teacher may, for example, require that the students respond to: "Patty rode her bike to (a) the store, (b) Betty's house, or (c) her father's office."

In addition to testing, the radio-controlled teaching device is used to present programmed instruction in a similar manner, except the lesson is reproduced by a plural-channel tape player with the audio portion recorded on a first channel and the tones recorded on a second channel. The audio channel is presented via headphones or a small loudspeaker, depending on whether the programmed lesson is administered to one student, a small group of students, or to the entire class. The teacher transmitter unit contains recording and playback logic and interface jacks so the teacher can utilize a plural-channel (stereo) recorder to prepare his own programmed lessons. Commercially programmed lessons can also be used.

DESCRIPTION OF THE PREFERRED EMBODIMENT

Figure 1:
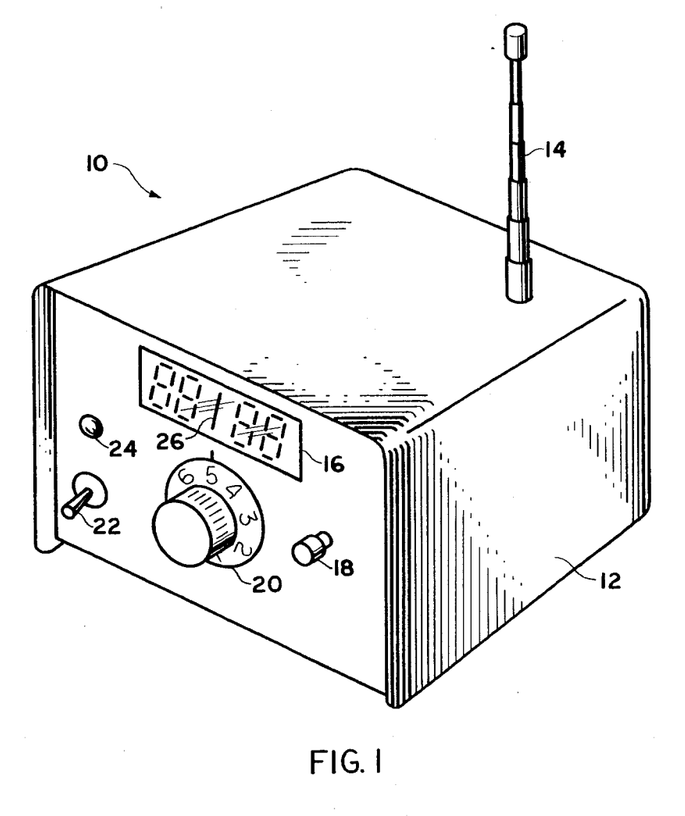
FIG. 1 is a perspective view of the student receiver unit of the present invention.

Referring to FIG. 1, a student receiver unit 10 of the radio-controlled teaching device is shown. The exterior of the receiver unit consists of a housing 12, telescopic antenna 13, liquid crystal display 16, response switch 18, frequency selection switch 20, power on/off switch 22, a low battery indicator 24. Each student within a classroom is provided with a student receiver 10, which is kept on his desk. In use, the telescopic antenna 14 is extended to full length, and power switch 22 is placed in an "on" position causing liquid crystal display (LCD) 16 to be energized. An "on" indicator light is not provided, since the LCD is energized each time the receiver is powered. The LCD, therefore, serves as an "on" indicator. The indexed frequency selection switch 20 is turned to the proper number, as designated by the classroom teacher. Each time a companion radio transmitter is actuated by the teacher, student receiver unit 10 detects the transmission and increases a "right" count, as displayed by the two right-hand LCD digits, or increases the "wrong" count of the two left-hand display digits, depending on whether or not the student has depressed a response switch 18 at the correct instant. A bar 26, or other suitable geometric form within the LCD separates the "right" and "wrong" digits of display 16 whenever it is energized by power switch 22. With antenna 14 telescoped, the receiver unit 10 is small enough to fit inside a student desk when the unit is not in use. Since the receiver is battery powered, the receiver is portable and needs no external wired connections. Low battery indicator 24 is illuminated only when the receiver battery drops below a predetermined voltage and is in need of replacement. Receiver 10 will be subsequently described with reference to FIGS. 5 and 6.

Figure 2:
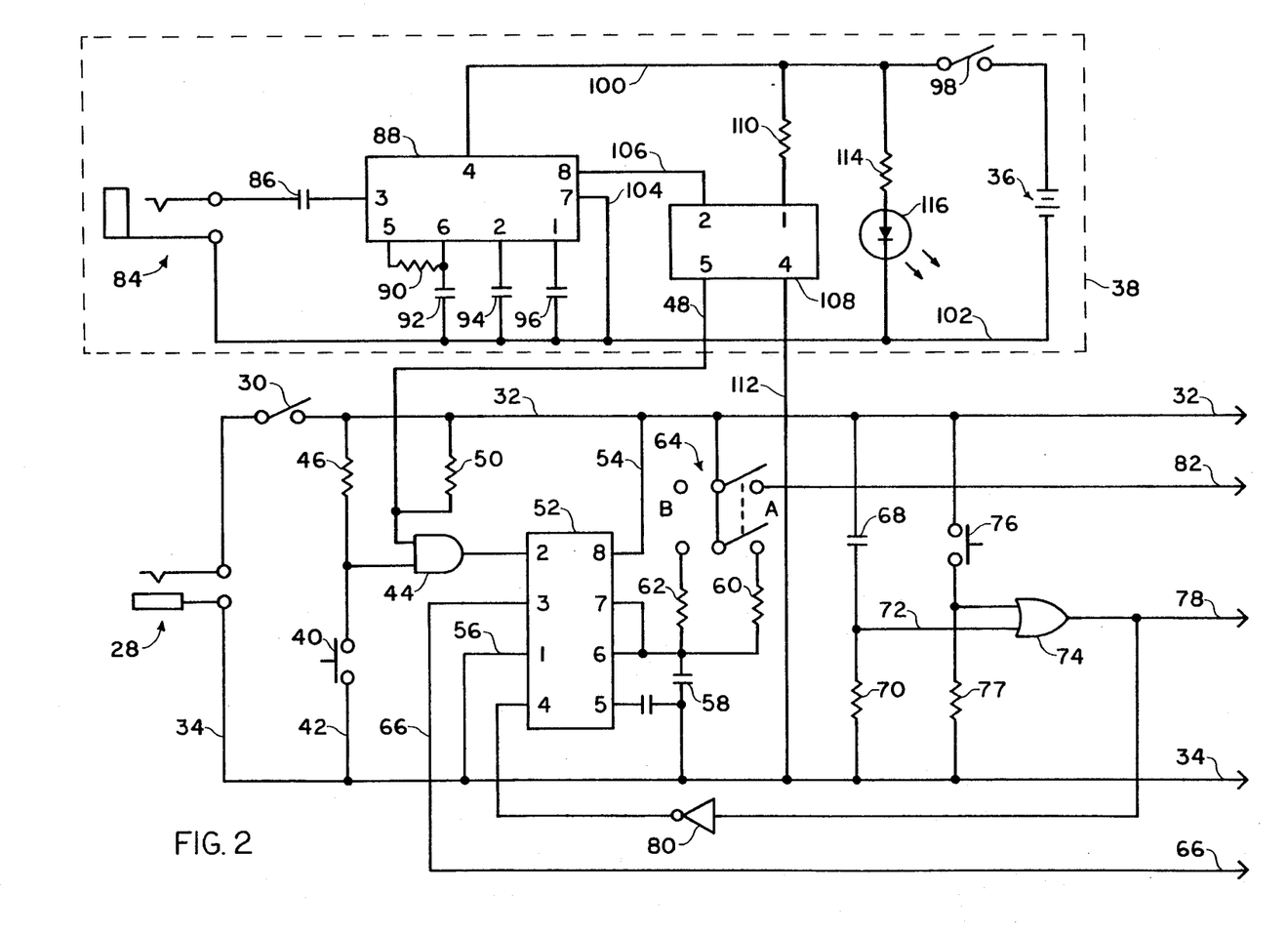
FIG. 2 is a schematic diagram showing the power input, power switch, tone switch, tone timer, record switch, power-on reset, reset switch, playback input, phase locked loop, optoisolator, battery-on indicator, battery switch, and battery of the teacher transmitter unit of the present invention.

Referring next to FIG. 2, the power input, power switch, tone switch, tone timer, record switch, power-on reset, reset switch, playback input, phase locked loop, optoisolator, battery-on indicator, battery switch, and battery of the teacher transmitter unit are shown. Briefly, the teacher transmitter unit contains a radio transmitter which transmits a preselected tone of short duration in response to manual depression of a tone switch, or in response to tone control signals recorded on a plural channel tape record. The teacher transmitter unit is primarily powered by a 120 VAC/9 VDC adapter which is plugged into any convenient wall socket and into a co-axial power input jack 28. When a power switch 30 is closed, +V appears on line 32 and ground on line 34. A separate 9 V transistor battery 36 is provided to power a playback circuit 38 which is used only when recorded programmed instruction is administered.

Tone signals are manually initiated by the teacher by depressing a normally open, push button tone switch 40. The switch is connected to ground via lines 34 and 42 and to a first input of a 4081 2-input AND gate 44, which functions as a negative logic OR. A pull-up resistor 46 is connected between +V line 32 and the first input of gate 44 to maintain a quiescent logical "1" until the input is grounded by depression of tone switch 40. A second input of AND gate 44 is connected, via line 48, to the output of playback circuit 38, thereby transmitting a negative pulse, via the output of gate 44, when tone switch 40 is depressed or when a recorded tone signal is detected by playback circuit 38. A pull-up resistor 50 is connected between +V line 32 and the second input of gate 44 to maintain a quiescent logical "1" until the input is grounded by detection of a recorded tone control signal. The output of gate 44 is connected to the trigger (pin 2) of a 555 monostable multivibrator which functions as a tone timer 52. The 555 receives +V via lines 32 and 54, and ground via lines 34 and 56. A timing capacitor 58, in conjunction with a timing resistor 60 or 62 (depending on the position of a DPDT record switch 64 which will be later described), provides a 1.2-second or a 0.8-second logical "1" output at pin 3 of timer 52. This timed output appears on line 66, and is used to actuate a tone generator and to clock display counters which will be subsequently described with reference to FIGS. 3 and 4.

Still referring to FIG. 2, a capacitor 68 and a resistor 70 form a positive edge detector power-on reset which has its output connected, via line 72, to a first input of a 4071 2-input OR gate 74. A second input of gate 74 is connected to +V line 32 via a normally-open push button reset switch 76; a pull-down resistor 77 maintains a logical "0" on the second gate input until reset switch 76 is depressed. The output of gate 74 appearing on line 78 provides a system reset which is actuated by the above power-on reset and reset switch. Reset switch 76 is provided to allow the instructor to reset an associated digital display to zero, without the necessity of opening and closing power switch 30. A 4049 inverter 80 inverts the reset output and is connected to the reset input (pin 4) of timer 52, which prevents a spurious timing cycle and resultant tone transmission from occuring during power-up glitches. Reset line 78 is, in turn, connected to display counters which will be further described with reference to FIG. 4.

The teacher transmitter unit can be used by the instructor to record programmed lessons on a plural channel tape. Using a stereo recorder, the left or right channel is used for recording the voice portion of the lesson (incorporating a mixer circuit, if music and sound effects are desired), while the remaining channel is connected to the teacher transmitter unit for recording control tones at predetermined points within the lesson where student response is expected. During the recording process, record switch 64, as shown in FIG. 2, is placed in the "B" position. The upper terminals of the DPDT switch control +V to a radio transmitter (FIG. 4) via line 82. Since the transmitter is not used during recording, record switch 64 cuts off power to the transmitter when in the "B" position. The switch's lower terminals conduct +V from line 32 to either timing resistor 60 or 62. In the "B" position, +V is conducted to timing resistor 62, resulting in a 0.8-second timing cycle of timer 52 each time tone switch 40 is depressed. Since the timer output actuates a tone generator during its timing cycle, a predetermined tone of 0.8 seconds is recorded on one tape channel each time the instructor depresses tone switch 40. Because the tape recorded tones are used during playback to automatically trigger tone timer 52 to produce transmitted tones of 1.2 seconds, the recorded tones are shorter in duration, i.e., 0.8 seconds. The above timing cycles and resulting tone durations are examples only, and can be of any reasonable duration as long as the recorded tones are shorter than the transmitted tones, and as long as both tones are of sufficient duration to exceed any switch bounce occuring when tone switch 40 is momentarily depressed. When record switch 64 is placed in the "A" position +V is conducted on line 82 to the radio transmitter shown in FIG. 4 and to timing resistor 60 which provides a 1.2-second timing cycle and concomitant tone. Thus, record switch 64 is in position "B" during recording of a programmed lesson, and is in position "A" when response tones are transmitted to student receivers during a live or recorded lesson.

Timing resistor 62 and its resultant 0.8-second timing cycle can be obviated by inserting a negative edge detector of a few mS between the output of AND gate 44 and the trigger (pin 2) of tone timer 52. With this arrangement, tone timer 52 always outputs a 1.2-second cycle and is independent of trigger pulse widths, since it is edge triggered. Thus, timer 52 would provide a 1.2-second time cycle even if recorded control tones were of the same or longer duration.

Again referring to FIG. 2, playback circuit 38 is utilized when a plural channel (stereo) tape player is connected to the teacher transmitter unit during administration of programmed instruction. The player's audio output channel carrying voice recording is connected to headphones or a small loudspeaker, depending on whether the lesson is being presented to one student, a group of students, or to the entire class. The player's audio output channel carrying tone signals is connected to the transmitter unit via a playback input jack 84. Any tone signals appearing at jack 84 are coupled by a small capacitor 86 to the input (pin 3) of a 567 phase locked loop (PLL) 88.

The phase locked loop functions as a tone decoder, thereby providing a tuned circuit which is responsive only to a given tone recorded on the control channel of a stereo tape. The 567 PLL integrated circuit includes a current controlled oscillator, phase detector, amplifier, quadrature phase detector, and power output stage. When a recorded control tone falls within the center frequency of the PLL's current controlled oscillator, the quadrature phase detector drives its associated power output stage on. A resistor 90 and a small capacitor 92 determine the PLL's center frequency which is selected to be 697 Hz, for example. A low pass filter capacitor 94 sets the detection bandwidth, and an output filter capacitor 96 sets the band edge of the PLL's low pass filter. When a battery switch 98 is closed, the PLL receives +V via line 100 and pin 4, and ground via lines 102, 104, and pin 7.

The output of PLL 88 appears at pin 8 and line 106 which, in turn, are connected to the cathode (pin 2) of a gallium arsenide infrared emitting diode of a 4N33 photo-Darlington optoisolator 108. The anode (pin 1) of the above diode is connected to +V line 100 via a current limiting resistor 110, causing the diode to be illuminated when PLL output line 106 drops to logical "0" in response to a detected control tone. The infrared diode of optoisolator 108 is optically coupled to a silicon planar NPN photo-Darlington transistor which has its emitter (pin 4) connected to system ground via lines 34 and 112. The transistor's collector (pin 5) is connected, via line 48, to the second input of AND gate 44, causing the gate to transmit a logical "0" pulse and, thus, trigger tone timer 52 each time a recorded control tone is detected.

A current limiting resistor 114 and light emitting diode battery-on indicator 116 are series connected between +V line 100 and ground line 102, so that the battery-on indicator is illuminated when battery switch 98 is closed. Since playback circuit 38 is energized only during playback of a recorded programmed lesson, battery-on indicator 116 serves to remind the instructor to switch off the circuit when the lesson has been completed. The above described optoisolator circuit is provided to electrically isolate the tape player from the teacher unit's radio transmitter so that resultant transmitted tones are not coupled back to the voice channel of the player. The control tones must, of course, be transparent to the students so they will not have a tone cue as to when to respond.

Figure 3:
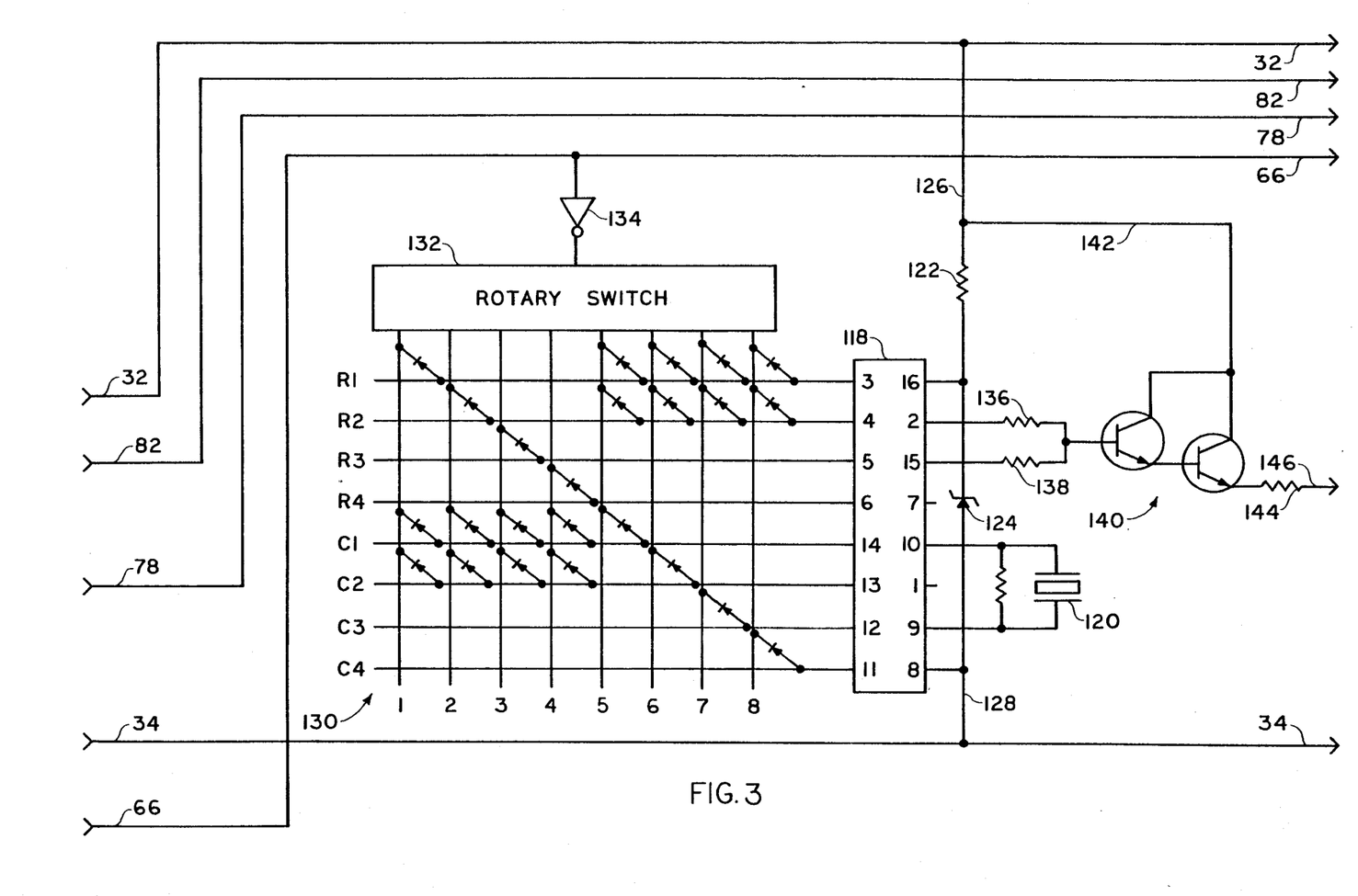
FIG. 3 is a schematic diagram showing the frequency switch, diode ROM, tone generator, and tone amplifier of the teacher transmitter unit of the present invention.

Referring next to FIG. 3, a frequency selection switch, diode ROM, tone generator, and tone amplifier of the teacher transmitter unit are shown. To assure the accuracy of tones generated by the teacher transmitter unit, a Motorola MC14410 2-of-8 Tone Encoder is provided as a tone generator 118. The MC14410 is normally used to generate standard dual tone multi-frequency (DTMF) signals for telephone tone dialing, and contains two on-chip sine wave generators which are controlled by a 1 MHz crystal 120. The two frequency generators, one low band and one high band, produce a total of eight digitally synthesized sine wave tones ranging from 687 Hz to 1633 Hz and which have a frequency accuracy of ±0.2%. In normal telephone dialing applications, one row input (pin 3, 4, 5, or 6) and one column input (pin 14, 13, 12, or 11) are simultaneously grounded by a dial keypad to provide a standard DTMF signal. In this embodiment, however, a multiple key lockout circuit within the MC14410 is used to provide single, rather than dual, tones. Since the tone generator requires a maximum operating current of 2.9 mA at 6 VDC, a current limiting resistor 122 and 5.6 V Zener diode 124 provide 2.9 mA at 5.6 VDC to the VDD input (pin 16). The cathode of the Zener diode is connected, via resistor 122 and line 126, to 9 V line 32. The tone generator chip receives ground via lines 128 and 34, and pin 8.

The above described row and column inputs are connected to a diode read-only memory (ROM) 130 via ROM output lines R1, R2, R3, R4, C1, C2, C3, and C4. The ROM input lines (1-8) are connected to each of eight outputs of a 1-pole, 8-position rotary switch which functions as a frequency selection switch 132. The single pole of switch 132 is connected, via a 4049 inverter 134, to tone timer output line 66, thereby conducting a logical "0" timing voltage in response to depression of tone switch 40 (FIG. 2) or detection by playback circuit 38 (FIG. 2) of a recorded control signal. When inverter 134 transmits a logical "0" voltage, it is conducted through switch 132 to one of eight output lines, depending upon the position of the rotary switch. Switching diodes are provided in ROM 130 to electrically connect the various rotary switch output lines to given row and column inputs of tone generator 118. For example, when frequency selection switch 132 is in the "1" position, any logical "0" tone timer output is conducted from switch output "1" to tone generator inputs R1, C1, and C2. Since two column inputs (C1 and C2) are simultaneously grounded, only a low band tone (687 Hz) associated with R1 is generated at pin 2, while the high band tone at pin 15 is inhibited. Thus, when frequency selection switch 132 is in position "1", a single tone of 687 Hz is generated. When, for example, switch 132 is in position "8", any logical "0" tone timer output is conducted to tone generator inputs C4, R1, and R2. Since both row inputs are simultaneously grounded, the low band tone is inhibited while a single high band tone (1633 Hz) associated with C4 is generated at pin 15. In this way, diode ROM 130 grounds various inputs of tone generator 118 to produce a single preselected tone of 687, 770, 852, 941, 1209, 1336, 1477, or 1633 Hz. These tones are generated for a time duration corresponding to the tone timer cycle, which, as previously described, can be 1.2 seconds when tone switch 40 (FIG. 2) is depressed or during playback of recorded tones, and 0.8 seconds when record switch 64 is in position "B" during the recording of tone control signals.

The outputs of tone generator 118 at pins 2 and 16 are, in turn, connected, via resistors 136 and 138, to the base of an NPN Darlington transistor functioning as a tone amplifier 140. The Darlington collector is connected to +V line 32 via lines 126 and 142, and the emitter is connected, via a current limiting resistor 144 and line 146, to the input of a radio transmitter which will be described with respect to FIG. 4. Selection of any one of eight tones which can be transmitted by the teacher transmitter unit is provided so that other transmitters (separated by a minimum of 25 feet) operating in adjacent classrooms will not interfere with each other. For example, a teacher in classroom 3 may elect to transmit control tones of 941 Hz, while a teacher in classroom 2 will transmit tones of 852 Hz, and a teacher in classroom 4 may transmit tones of 1209 Hz. Since the range of most low-power radio transmitters is several hundred feet, the provision of discrete transmission tones prevents conflict when several teacher transmitter units are being simultaneously used. Of course, the same control tone can be used by several adjacent transmitters, if individual carrier frequencies differ enough to provide adequate signal separation.

Figure 4:
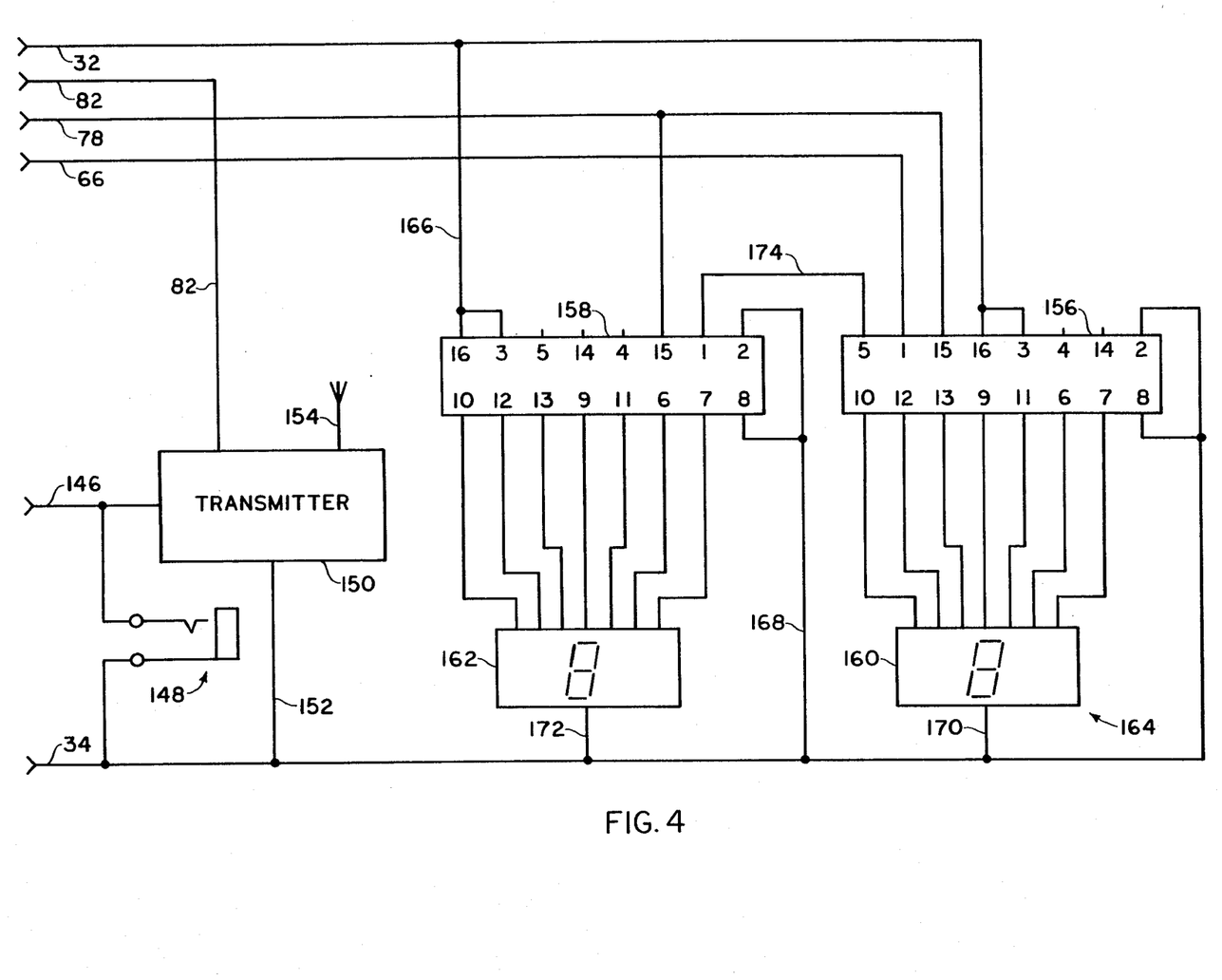
FIG. 4 is a schematic diagram showing the record output, transmitter, display counters, and LED display of the teacher transmitter unit of the present invention.

Referring now to FIG. 4, the record output, transmitter, display counters, and LED display of the teacher transmitter unit are shown. A record output jack 148 is connected between tone output line 146 and ground line 34, allowing generated control tones to be recorded on one channel of a plural tape record by connecting record output 148 with a record input of a stereo recorder. Since generated tones are amplified by a Darlington amplifier (FIG. 3), record output jack 148 is normally connected to the "Aux" record input of a stereo recorder; if the "Mic" input is used, an attenuating patch cord is used for the interconnection. A potentiometer can also be installed in conjunction with record output jack 148 to selectively set tone volume so generated control tones can be recorded via either a high or low level recorder input.

A low-power radio transmitter 150 of known design is provided to transmit control tones from the teacher transmitter unit to one or more student receiver units. Transmitter 150 receives +V via line 82 which, as described with reference to FIG. 2, is controlled by a record switch 64. Line 82 is normally energized, with switch 64 in the "A" position, unless the control tones are being recorded during preparation of a programmed lesson, when record switch 64 will be in the "B" position. Ground for the transmitter is provided via lines 152 and 34. The transmitter may transmit on a suitable frequency, such as 27 or 49 MHz, and has an RF output of 100 mW or less. The transmitter is crystal controlled and may contain an audio preamplifier, modulator, crystal controlled oscillator, and power amplifier. A telescopic antenna 154 is mounted atop the teacher transmitter unit housing (not shown) and is fully extended during all transmissions of tones which, via line 146, modulate the transmitter's carrier frequency. The transmitter circuit may be configured for either amplitude or frequency modulation, but amplitude modulation is preferred because of its simplicity.

Each time a tone signal is transmitted, the event is counted by cascaded 4026 decade counters 156 and 158, which contain internal 7-segment decoder/drivers, and displayed by associated common cathode, 7-segment light emitting diodes 160 and 162 which comprise LED display 164. The counters receive +V via lines 32 and 166, and pin 16. Ground is provided to the counters and display LED's via lines 34, 168, 170, and 172. Display enables (pin 3) are held high via lines 32 and 166, and clock enables (pin 2) are held low via lines 34 and 168. Counter 156 functions as a units counter, and has its divide-by-10 output (pin 5) connected, via line 174, to the clock (pin 1) of counter 158 which functions as a tens counter. Counter 156 is positive-edge clocked by tone timer output line 66, which is connected to the counter's clock input (pin 1), and advances one count for each tone timing cycle. Both counters are reset to zero by system reset line 78 which is connected to reset pins 15. As previously described, reset occurs during power-up and when reset push button 76 (FIG. 2) is momentarily depressed.

Since the above counters provide current limiting display outputs, a red, 7-segment LED 160 is directly connected to counter 156, and becomes the units portion of LED display 164. Similarly, a red, 7-segment LED 162 becomes the tens portion of LED display 164. Seven-segment LED's 160 and 162 are relatively high in brightness (500 microcandelas) providing good visibility for display 164 which is mounted on the face of the teacher transmitter unit housing (not shown). The purpose of display 164 is to provide the instructor with a readout of the total number of tones which have been transmitted to his students, so that the students' number of "right" and "wrong" responses can be scored with respect to the number of correct responses expected. For example, if LED display 164 reads "35" at the conclusion of a lesson, a perfect student score would be zero "wrong" and 35 "right". Because of moderate power consumption by the LED display, an AC power adapter, rather than batteries, is used to primarily power the transmitter unit.

In summary, the teacher transmitter unit is used in a classroom to: (1) manually transmit a preselected tone to one or more student receivers at selected intervals during the oral reading of textual or test material, (2) automatically transmit a preselected tone to one or more student receivers at selected intervals during the presentation of recorded programmed instruction, and (3) provide a manually controlled tone source for the preparation and recording of programmed lessons.

Figure 5:
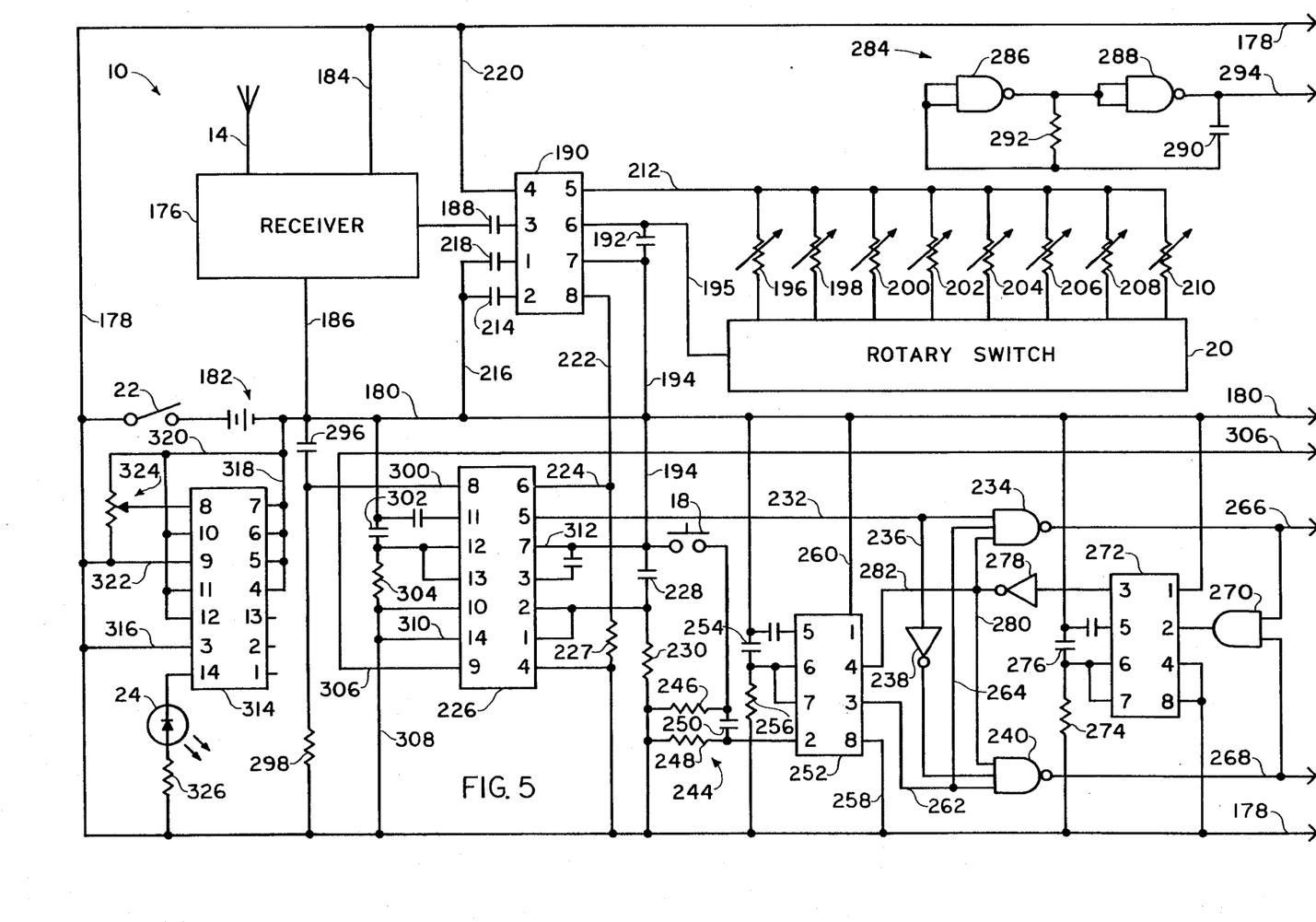
FIG. 5 is a schematic diagram showing the power switch, battery, voltage comparator, low battery LED, response window timer, system power-on reset, response switch, response switch negative edge detector, response switch timer, logic gates, disable timer, receiver, phase locked loop, frequency selection switch, and display square wave generator of the student receiver unit of the present invention.

Referring next to FIG. 5, the power switch, battery, voltage comparator, low battery LED, response window timer, system power-on reset, response switch, response switch negative edge detector, response switch timer, logic gates, disable timer, radio receiver, phase locked loop, frequency selection switch, and display square wave generator of the student receiver unit are shown. As previously described with reference to FIG. 4, a brief tone signal is transmitted to each student receiver when a student response to textual material is desired. Student receiver unit 10 contains a small, low-power radio receiver 176 of known design which may be super-regenerative or superheterodyne in type and may be crystal controlled. The radio receiver is, of course, tuned to the transmitter frequency which may be 27 or 48 MHz. A telescopic antenna 14 is provided atop the receiver housing (FIG. 1), and is fully extended during operation of the receiver unit (a shorter, flexible antenna may be substituted for the rigid telescopic antenna, if desired).

During operation, the student receiver unit 10 is energized by closing power switch 22, so that line 178 conducts +V and line 180 conducts ground of a 9 VDC transistor battery 182. The radio receiver 176, thus, receives +V lines 178 and 184 and ground via lines 180 and 186. Any received tone is AC coupled, via a small capacitor 188 and pin 3, to a phase locked loop (PLL) 190. Since any one of eight tones (687, 770, 852, 941, 1209, 1336, 1477, or 1633 Hz) is received, PLL 190 is made programmable to detect any one of the tones. The center frequency of the PLL is determined by a resistor connected between pin 5 and a capacitor 192 which, in turn, is series connected between pin 6 and ground lines 194 and 180. To make the center frequency programmable, a 1-pole, 8-position rotary switch which functions as a frequency selection switch 20 is connected between pins 6 and 5 via line 195, one of eight variable resistors 196, 198, 200, 202, 204, 206, 208, and 210, and line 212. Each variable resistor, comprising a 15-turn potentiometer, is preset so that the PLL's center frequency corresponds to one of the above eight frequencies when frequency selection switch 20 is rotated to one of its eight indexed positions. The teacher informs his students as to which frequency setting is being used. A low pass filter capacitor 214 is connected between pin 2 and ground line 216, and an output filter capacitor 218 is connected between pin 1 and ground. The PLL receives +V via line 178 and line 220 and ground via lines 180 and 194. It should be noted that PLL 190 provides a tuned tone decoder which is actuated only by a specific tone which the instructor has selected for transmission.

The active PLL output which appears at pin 8 as a logical "0" is conducted, via lines 222 and 224, to the trigger (pin 6) of a 556 dual timer 226. A pull-up resistor 227 is connected between PLL output line 222 and +V line 178 to maintain a quiescent logical "1" on the timer trigger input. The right half of timer 226 is used as a monostable multivibrator to provide a brief "response window" during which a student must respond to a received tone signal. A timing capacitor 228 and resistor 230 provide a 2-second timing cycle each time PLL 190 outputs a detected tone signal. The 2-second response window timer output appears at pin 5, and is conducted on line 232 to a first input of a 4023 3-input NAND gate 234. The timer output is also conducted, via line 232, line 236, and a 4049 inverter 238, to a second input of a 4023 NAND gate 240. NAND gates 234 and 240 and inverter 238 provide the logic necessary to generate a "right" count if a response switch 18 is depressed during the previously described 2-second response window, or a "wrong" count if response switch 18 is depressed outside the response window.

A normally-open push button switch, having its input connected to ground via lines 180 and 194 and its output connected to a negative edge detector 244, functions as response switch 18, and is depressed by the student each time a designated portion of textual material is reached during oral reading of that material. Negative edge detector 244 is comprised of pull-up resistors 246 and 248, and a small capacitor 250. The detector output is, in turn, connected to the trigger input (pin 2) of a 555 timer used as response switch timer 252, and provides a brief logical "0" trigger input regardless of how long the response button is depressed. A timing capacitor 254 and resistor 256 provide a monostable timing cycle of approximately one second, although the timing cycle is routinely aborted, as will be subsequently described.

Response switch timer 252 receives +V via lines 178 and 258, and ground via lines 180 and 260. The 1-second response switch output appears at pin 3 as a logical "1" voltage and is conducted, via line 262, to a third input of NAND gate 240 and, via line 264, to a second input of NAND gate 234. As previously described, the 2-second response window output is inverted and conducted to a second input of gate 240. With this arrangement, the output of NAND gate 234 on line 266 drops to logical "0" when response switch 18 is depressed during a 2-second response window output; the output of NAND gate 240 on line 268 drops to logical "0" when response switch 18 is depressed preceeding or subsequent to a "response window." The low output on line 266 is used to initiate a "right" count on a liquid crystal display (LCD) which will be later described with reference to FIG. 6. The low output on line 268 is used to initiate a "wrong" count on an LCD which also will be described with reference to FIG. 6.

Lines 266 and 268 also conduct a low output appearing on either one to a first or second input of a 4081 2-input AND gate 270, which functions as a negative logic OR. The output of AND gate 270 is connected to the trigger (pin 2) of a 555 timer which functions as disable timer 272. A timing resistor 274 and capacitor 276 provide a 2.2-second timing cycle which is slightly longer than the previously described 2-second response window, and which is used to disable NAND gate 234 and 240 and response switch timer 252 immediately following a "right" output on line 266 or a "wrong" output on line 268. The output (pin 3) of disable timer 272 is connected to a 4049 inverter 278 which has its output connected, via line 280, to a third input of NAND gate 234 and a first input of NAND gate 240 and, via line 282, to the reset input (pin 4) of response switch timer 252. Prior to a student response, the inverted disable timer output on lines 280 and 282 is at logical "1", thereby enabling gates 234 and 240 and response timer 252. Immediately subsequent to a response, the inverted output drops to logical "0", causing the outputs of both NAND gates to go high and the response timer output to go low and remain there for the 2.2-second disable timing cycle. The disable circuit assures that only one count for each response, either "right" or "wrong", will be displayed by the LCD readout, and that only one response will be counted during a "response window."

Timing cycles for both the response window and disable timers can, of course, be increased or decreased, as long as they remain nearly equal. Any increase in timing cycles will, however, slow receiver response time, thereby requiring more separation between tone transmissions and resulting responses. When using a 2-second response window, as herein suggested, the student can be expected to respond as rapidly as once in 2.5 seconds. It should be noted that response switch negative edge detector 244, in conjunction with disable timer 272, prevents the student from automatically making multiple responses, if and when he attempts to maintain the response switch in a closed position.

A display square wave generator 284 provides an AC drive voltage to the LCD readout, and comprises 4011 2-input NAND gates 286 and 288, a timing capacitor 290 and resistor 292. The capacitor and resistor are selected to provide a 32 Hz square wave output which appears on line 294. Line 294 is, in turn, connected to the phase inputs of two LCD decoder/drivers and to the backplane of an LCD readout which will be later described with reference to FIG. 6. The left half of dual timer 226 is configured as a monostable multivibrator, and provides a system power-on reset. The trigger input (pin 8) is connected to a negative edge detector comprising a capacitor 296 and a resistor 298. When power switch 22 is closed, a brief negative pulse is conducted on line 300 to the timer trigger. A timing capacitor 302 and resistor 304 are selected to provide a 4-second logical "1" output at pin 9 and on reset line 306. Reset line 306 is, in turn, connected to the reset inputs of two counters which also will be described with reference to FIG. 6. Dual timer 226 receives +V via lines 178, 308, and 310 and ground via lines 180, 194, and 312. As with response switch timer 252, disable timer 272, and tone timer 52, the voltage control inputs of dual timer 226 (pins 3 and 11) are bypassed to ground via small capacitors. The reset inputs (pins 4 and 10) of timer 226 are tied high.

A 339 linear quad voltage comparator 314 and low battery light emitting diode (LED) are provided to indicate to the student and teacher when battery 182 needs replacing. The comparator receives +V via lines 178 and 316, and pin 3. Ground is provided via lines 180, 318, and 320, and pin 12. One of the four noninverting comparator inputs (pin 9) is used as the sample voltage input, and is connected to +V via lines 178, and 322. The associated inverting input (pin 8) is used as a reference voltage input, and is connected to the wiper of a trimmer potentiometer 324. The resistive element of potentiometer 324 is connected between +V and ground, allowing the input threshold trip voltage (reference voltage) to be set to a predetermined level. Remaining unused comparator inputs are grounded.

Since battery 182 is 9 volts, potentiometer 324 is adjusted so that comparator 314 conducts a logical "0" voltage level when the sample battery voltage on line 322 is at 6 volts or below. At this level, the battery should be replaced. The output for the comparator used appears at pin 14 which, in turn, is connected to the cathode of low battery LED 24. The LED anode is connected to +V via a current limiting resistor 326 to limit current drain to about 10 mA. When battery replacement is necessary, the comparator output at pin 14 swings to ground, allowing LED 24 to glow. The LED will, of course, briefly flash when power switch 22 is opened or closed, but the battery is not replaced unless the LED is constantly illuminated.

Figure 6:
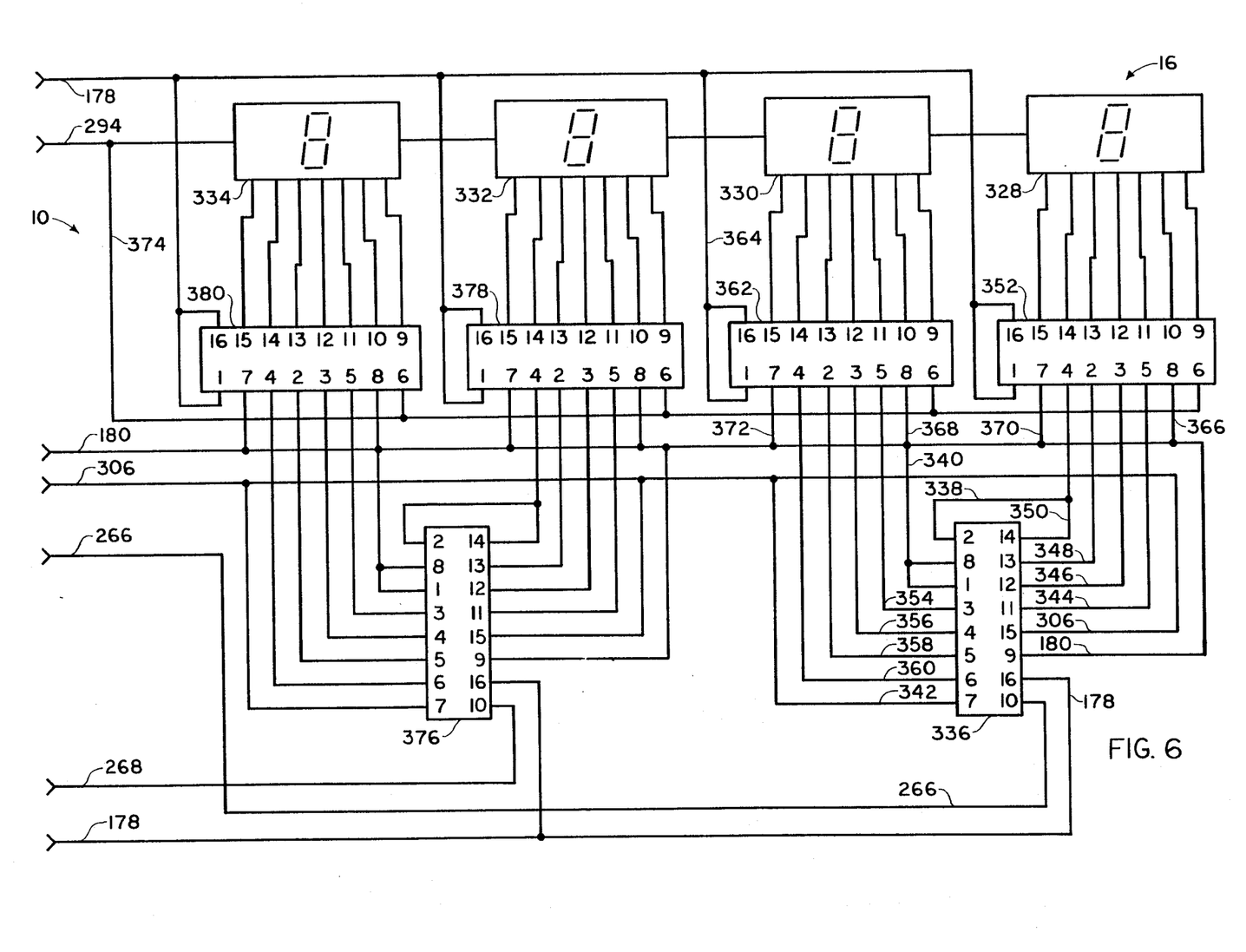
FIG. 6 is a schematic diagram showing the liquid crystal display, display decoder/drivers, and display counters of the student receiver unit of the present invention.

Referring now to FIG. 6, a liquid crystal display, display decoder/drivers, and display counters are shown. The liquid crystal display 16 is divided into two sections by a bar or other geometric form, as shown in FIG. 1. Liquid crystal digital readouts 328 and 330 comprise the one and tens digits, respectively, of the right portion of LCD 16, thereby providing a "right" count display of "00" to "99". Liquid crystal digital readouts 332 and 334 comprise the ones and tens digits, respectively, of the left portion of LCD 16, and provide a "wrong" count display of "00" to "99." Since there is no zero blanking, display 16 is energized whenever student receiver unit 10 is powered, thus providing a visual "on/off" indicator. Liquid crystal readouts, rather than LED readouts, are provided in the receiver unit to conserve power, since the unit is battery powered.

The "right" count line 266 is connected to the enable input (pin 10) of a 4518 dual divide-by-10 counter 336, and causes the counter to advance one count on a negative edge each time a student depresses response switch 18 during a "response window", as was described with reference to FIG. 5. The two counters of dual counter 336 are ripple cascaded by connecting the "8" output (pin 14) of the first counter to the enable input (pin 2) of the second counter via line 338. In this configuration, both clock inputs (pins 9 and 1) are connected to ground via lines 180 and 340. The resets (pins 15 and 7) are connected, via lines 306 and 342, to system reset and are at logical "0" except for a 4-second interval when the receiver unit power switch is initially turned on, thereby triggering the reset timer of dual timer 226 (FIG. 5). The "1," "2," "4," and "8" count outputs of the first counter are conducted, via lines 344, 346, 348, and 350, to corresponding counts inputs of an associated 4543 BCD-to-7-segment decoder/driver 352. Dual counter 336 receives +V via line 178 and pin 16, and ground via lines 189 and 340 and pin 8.

The "1," "2," "4", and "8" count outputs of the second counter of dual counter 336 are conducted, via lines 354, 356, 358, and 360, to corresponding count inputs of an associated 4543 BCD-to-7-segment decoder/driver 362. Decoder/drivers 352 and 362 receive +V via lines 178 and 364 and pin 16, and ground via lines 180, 366, and 368, and pin 8. Since the latch disables (pin 1) are not used, they are tied high via lines 178 and 364. Blanking inputs (pin 7) are also not used and are grounded via lines 180, 360, and 372. The phase inputs (pin 6) are connected to display square wave generator 284 (FIG. 5) via lines 294 and 374. Generator line 294 is also connected to the backplane of all LCD readouts, and provides a 32 Hz AC drive voltage which energizes various segments of the displays when the outputs of the decoder/drivers are in opposite phase to the backplane. Generator line 294 is inverted (not shown) to energize the bar which separates "right" and "wrong" display counts. Decoder/driver output pins 9, 10, 11, 12, 13, 15, and 14 are directly connected to the a, b, c, d, e, f, and g segment inputs, respectively, of each associated LCD readout.

The "wrong" count line 268 is connected to the enable input (pin 10) of a second 4518 dual divide-by-10 counter 376, causing the counter to advance one count on a negative edge each time a student depresses response switch 18 when the "response window" is "closed," i.e., when no tone has been received and response window timer 226 (FIG. 5) is at logical "0." Dual timer 376 is also ripple cascaded and, in association wth 4543 decoder/drivers 378 and 380, provides a "00" to "99" "wrong" count on LCD's 332 and 334. Since the interconnections for the "wrong" count display are identical with those for the "right" count display, they will not be further described. It should be noted that a student can simply open and close power switch 22 of his receiver unit to "erase" a "wrong" score, but this procedure will also "erase" any "right" score he has earned, resulting in a display reading: "00/00." In this situation, the teacher can only assume the student has made no attempt to respond during a given lesson.

Although power supply lines have been shown schematically for nearly all components of the teacher transmitter and student receiver units, supply lines are presumed, but not shown, for individual gates and inverters in order to simplify the drawings. Several bypass capacitors are also needed in conjunction with the various CMOS integrated circuits, and are presumed even though they are not shown.

Although a radio communication link has been described for the teaching device of the present invention, other communication links, such as infrared and ultrasonics, can be used. A radio transmitter and companion receivers are preferred, however, because of inherent range and lack of directionality. Although a dual "wrong/right" display is provided in the student receiver unit, a single "right" display can also be used. By connecting "right" count line 266 to the "up" clock input of two cascaded decade up-down counters, such as 4192's, and by connecting "wrong" count line 268 to the "down" clock input, a single two-digit readout can be used to display the total correct response, minus those which are incorrect. The counters can be preset to zero on the down count, so that a score cannot go below zero. Although the radio-controlled teaching device described is capable of presenting recorded programmed instruction, the device provides a method by which the instructor can intermittently and spontaneously remain in radio contact with each of his or her students throughout the classroom day.

The terms and expressions which have been employed in the foregoing drawings, abstract, and specification are used therein as terms of description and not of limitation; it being understood that changes may be made in the embodiments disclosed without departing from the spirit and scope of the invention as defined in the following claims.

What is claimed is:

1. A radio-controlled teaching device comprising in combination: a teacher transmitter unit containing tone generation means, timing means associated with and controlling the duration of tones generated by said tone generation means, manual switching means operatively connected to said timing means for actuating said timing means and said tone generation means at selected points during oral reading of textual material or test material, counting and readout means operatively associated with said timing means for counting and displaying the number of times said tone generation means are actuated, manual reset means operatively connected to said counting and readout means for selectively resetting said readout means to zero, and a radio transmitter operatively coupled to the output of said tone generation means for transmitting tones generated by said tone generation means; and a plurality of portable student receiver units containing a battery power supply, a radio receiver tuned to the carrier frequency of said transmitter, a tone decoder operatively connected to the output of said radio receiver, a first timing means operatively connected to and actuated by the output of said tone decoder for providing a short time period during which a student is expected to respond at said selected points during oral reading of textual or test material, a response switch which is momentarily closed by the student at said selected points during oral reading of textual or test material, a second timing means operatively connected to and actuated by said response switch for providing a brief time period when said response switch is closed, a first logic gate and a second logic gate operatively connected to said first and second timing means wherein a "right" pulse is conducted by said first logic gate when said response switch is momentarily closed during said short time period of said first timing means and, wherein a "wrong" pulse is conducted by said second logic gate when said response switch is momentarily closed when said short time period of said first timing means is not occuring, a third timing means operatively connected to the outputs of said first logic gate and second logic gate and actuated by said "right" pulse or "wrong" pulse for momentarily disabling said second timing means and said first logic gate and second logic gate when said response switch is momentarily closed, a first counter operatively connected to the output of said first logic gate, whereby a said "right" pulse advances said first counter one count when said "right" pulse occurs, a second counter operatively connected to said second logic gate, whereby said "wrong" pulse advances said second counter one count when said "wrong" pulse occurs, first decoder/drivers and liquid crystal readouts operatively connected to the outputs of said first counter for displaying the current count of said first counter, and second decoder/drivers and liquid crystal readouts operatively connected to the outputs of said second counter for displaying the current count of said second counter.

2. A radio-controlled teaching device according to claim 1, wherein said tone generation means of said teacher transmitter unit are actuated by the teacher at said selected points, such as the end of each paragraph, during said oral reading of textual material, whereby a tone signal is transmitted by said teacher transmitter unit to a plurality of said student receiver units, one of said student receiver units and one copy of written text being provided for each student of a classroom, said tone signal being detected by all of said student receiver units and causing a "right" score to be displayed by an associated digital readout when said response switch of a student receiver unit is momentarily closed within a short time period following tone reception, and causing a "wrong" score to be displayed by an associated digital readout when said response switch is momentarily closed when said tone signal has not been transmitted and received.

3. A radio-controlled teaching device according to claim 2, wherein said tone generation means of said teacher transmitter unit are operatively associated with counting and digital readout means, said digital readout means further comprising a two-digit display, whereby said digital readout means display the total number of times said tone generation means are actuated for notifying the teacher of the total number of correct responses expected for a given lesson comprising said oral reading of textual material.

4. A radio-controlled teaching device according to claim 1, wherein said tone generation means of said teacher transmitter unit are actuated by the teacher during oral reading by said teacher of a correct answer associated with a previously presented multiple-choice or true or false question, whereby a tone signal is transmitted by said teacher transmitter unit to a plurality of said student receiver units, one of said student receiver units being provided for each student of a classroom, said tone signal being detected by all of said student receiver units and causing a "right" score to be displayed by an associated digital readout when said response switch of a student receiver unit is momentarily closed within a short time period following reception of said tone signal, and causing a "wrong" score to be displayed by an associated digital readout when said response switch is momentarily closed when said tone signal has not been transmitted and received for extemporaneously testing each member of a school classroom without requiring written student responses.

5. A radio-controlled teaching device according to claim 4, wherein said tone generation means of said teacher transmitter unit are operatively associated with counting and digital readout means, said readout means further comprising a two-digit display, whereby said digital readout means display the total number of times said tone generation means are actuated for notifying the teacher of the total number of correct responses expected for a given test comprising multiple-choice or true or false questions.

6. A radio-controlled teaching device according to claim 1, wherein said response switch of said student receiver units further comprises an edge detector operatively connected between said response switch and said second timing means, whereby closure of said response switch provides a single pulse independent of how long said response switch remains closed for preventing further scoring by said liquid crystal readouts when said response switch remains closed for a portion or all of a given lesson.

7. A radio-controlled teaching device according to claim 1, wherein said tone generation means of said teacher transmitter unit further comprise an indexed selection switch operatively connected between said timing means and said tone generation means for selecting one of a plurality of discrete tones transmitted by momentarily closing said manual switching means.

8. A radio-controlled teaching device according to claim 1, wherein said tone decoder of student receiver units further comprises an indexed selection switch connected between said tone decoder and a plurality of operatively associated timing resistors for selectively programming said student receiver units to receive one of a plurality of discrete transmitted tones by said teacher transmitter unit.

9. A radio-controlled teaching device comprising in combination: a teacher transmitter unit containing tone generation means, timing means associated with and controlling the duration of tones generated by said tone generation means, a first manual switching means operatively connected to said timing means for actuating said timing means and said tone generation means at selected points during oral reading of textual or test material, counting and readout means operatively associated with said timing means for counting and displaying the number of times said tone generation means are actuated, manual reset means operatively connected to said counting and readout means for selectively resetting said readout means to zero, a radio transmitter operatively coupled to the output of said tone generation means for transmitting tones generated by said tone generation means, a second manual switching means operatively connected between said timing means and associated timing resistors for reducing the duration of said timing means when using said teacher transmitter unit as a tone signal source for recording tone signals at designated points on one channel of a plural tape record during the recording of programmed instruction, and an audio output jack operatively connected to the output of said tone generation means for connecting said teacher transmitter unit to one record input of a plural channel tape recorder during said recording of programmed instruction; and a plurality of portable student receiver units containing a battery power supply, a radio receiver tuned to the carrier frequency of said transmitter, a tone decoder operatively connected to the output of said radio receiver, a first timing means operatively connected to and actuated by the output of said tone decoder for providing a short time period during which a student is expected to respond at said selected points during oral reading of textual or test material, a response switch which is momentarily closed by the student at said selected points during oral reading of textual or test material, a second timing means operatively connected to and actuated by said response switch for providing a brief time period when said response switch is momentarily closed, a first logic gate and a second logic gate operatively connected to said first and second timing means, wherein a "right" pulse is conducted by said first logic gate when said response switch is momentarily closed during said short time period of said first timing means and, wherein a "wrong" pulse is conducted by said second logic gate when said response switch is momentarily closed when said short time period of said first timing means is not occuring, a third timing means operatively connected to the outputs of said first logic gate and second logic gate and actuated by said "right" pulse or "wrong" pulse for momentarily disabling said second timing means and said first logic gate and second logic gate when said response switch is momentarily closed, a first counter opearatively connected to the output of said first logic gate, whereby a said "right" pulse advances said first counter one count when said "right" pulse occurs, a second counter operatively connected to said second logic gate, whereby said "wrong" pulse advances said second counter one count when said "wrong" pulse occurs, first decoder/drivers and liquid crystal readouts operatively connected to the outputs of said first counter for displaying the current count of said first counter, and second decoder/drivers and liquid crystal readouts operatively connected to the outputs of said second counter for displaying the current count of said second counter.

10. A radio-controlled teaching device according to claim 9, wherein said second manual switching means of said teacher transmitter unit further comprise a DPDT switch, the second terminals of said DPDT switch simultaneously disabling said radio transmitter during said recording of programmed instruction.

11. A radio-controlled teaching device comprising in combination: a teacher transmitter unit containing tone generation means, timing means associated with and controlling the duration of tones generated by said tone generation means, manual switching means operatively connected to said timing means for actuating said timing means and said tone generation means at selected points during oral reading of textual or test material, counting and readout means operatively associated with said timing means for counting and displaying the number of times said tone generation means are actuated, manual reset means operatively connected to said counting and readout means for selectively resetting said readout means to zero, a radio transmitter operatively coupled to the output of said tone generation means for transmitting tones generated by said tone generation means, an audio input jack for connecting said teacher transmitter unit to one audio output channel of a plural channel tape player, and a toner decoder operatively connected between said audio input jack and said timing means for automatically actuating said timing means and tone generation means in response to discrete tones recorded at selected points on one channel of a plural tape record; and a plurality of portable student receiver units containing a battery power supply, a radio receiver tuned to the carrier frequency of said transmitter, a tone decoder operatively connected to the output of said radio receiver, a first timing means operatively connected to and actuated by the output of said tone decoder for providing a short time period during which a student is expected to respond at said selected points during oral reading of textual or test material or during recorded presentation of programmed instructional material, a response switch which is momentarily closed by the student at said selected points during oral reading of textual or test material or during recorded presentation of programmed instructional material, a second timing means operatively connected to and actuated by said response switch for providing a brief time period when said response switch is momentarily closed, a first logic gate and a second logic gate operatively connected to said first and second timing means wherein a "right" pulse is conducted by said first logic gate when said response switch is momentarily closed during said short time period of said first timing means and, wherein a "wrong" pulse is conducted by said second logic gate when said response switch is momentarily closed when said short time period of said first timing means is not occuring, a third timing means operatively connected to the outputs of said first logic gate and second logic gate and actuated by said "right" pulse or "wrong" pulse for momentarily disabling said second timing means and said first logic gate and second logic gate when said response switch is momentarily closed, a first counter operatively connected to the output of said first logic gate, whereby a said "right" pulse advances said first counter one count when said "right" pulse occurs, a second counter operatively connected to said second logic gate, whereby said "wrong" pulse advances said second counter one count when said "wrong" pulse occurs, first decoder/drivers and liquid crystal readouts operatively connected to the outputs of said first counter for displaying the current count of said first counter, and second decoder/drivers and liquid crystal readouts operatively connected to the outputs of said second counter for displaying the current count of said second counter.

12. A radio-controlled teaching device according to claim 11, wherein said recorded presentation of programmed instructional material further includes a plural channel tape player, speaker, and instructional tape, a first audio output carrying recorded tone signals of said player being connected to said audio input jack of said teacher transmitter unit, a second audio output carrying recorded instructional material of said player being connected to said speaker for said recorded presentation of programmed instructional material to one or more students of a classroom, said students responding at selected points of said programmed instructional material by momentarily closing respective response switches of said student receiver units.

* * * * *

UNITED STATES PATENT AND TRADEMARK OFFICE
CERTIFICATE OF CORRECTION

PATENT NO. : 4,493,655
DATED : Jan. 15, 1985
INVENTOR(S) : James W. Groff

It is certified that error appears in the above-identified patent and that said Letters Patent is hereby corrected as shown below:

Column 2, line 57, "tion"." should read -- tion." --.

Column 3, line 57, "13" should read -- 14 --.

Column 3, line 59, "a low" should read -- and low --.

Column 4, line 9, "LCD" should read -- LCD, --.

Column 5, line 48, "position" should read -- position, --.

Column 7, line 38, "687" should read -- 697 --.

Column 7, line 50, "687" should read -- 697 --.

Column 7, line 57, "16" should read -- 15 --.

Column 9, line 47, "48" should read -- 49 --.

Column 9, line 56, "+V lines" should read -- +V via lines --.

Column 9, line 59, "687" should read -- 697 --.

Column 11, line 11, "gate" should read -- gates --.

Column 12, line 67, "counts" should read -- count --.

Column 13, line 2, "189" should read -- 180 --.

Column 13, line 12, "360" should read -- 370 --.

UNITED STATES PATENT AND TRADEMARK OFFICE
CERTIFICATE OF CORRECTION

PATENT NO. : 4,493,655

DATED : Jan. 15, 1985

INVENTOR(S) : James W. Groff

It is certified that error appears in the above-identified patent and that said Letters Patent is hereby corrected as shown below:

Column 17, line 43, "toner" should read -- tone --.

Signed and Sealed this

Twenty-eighth Day of May 1985

[SEAL]

Attest:

DONALD J. QUIGG

Attesting Officer    Acting Commissioner of Patents and Trademarks